(No Model.)
J. I. DU BOIS.
APPARATUS FOR DROPPING FERTILIZERS IN ROWS.
No. 356,224. Patented Jan. 18, 1887.
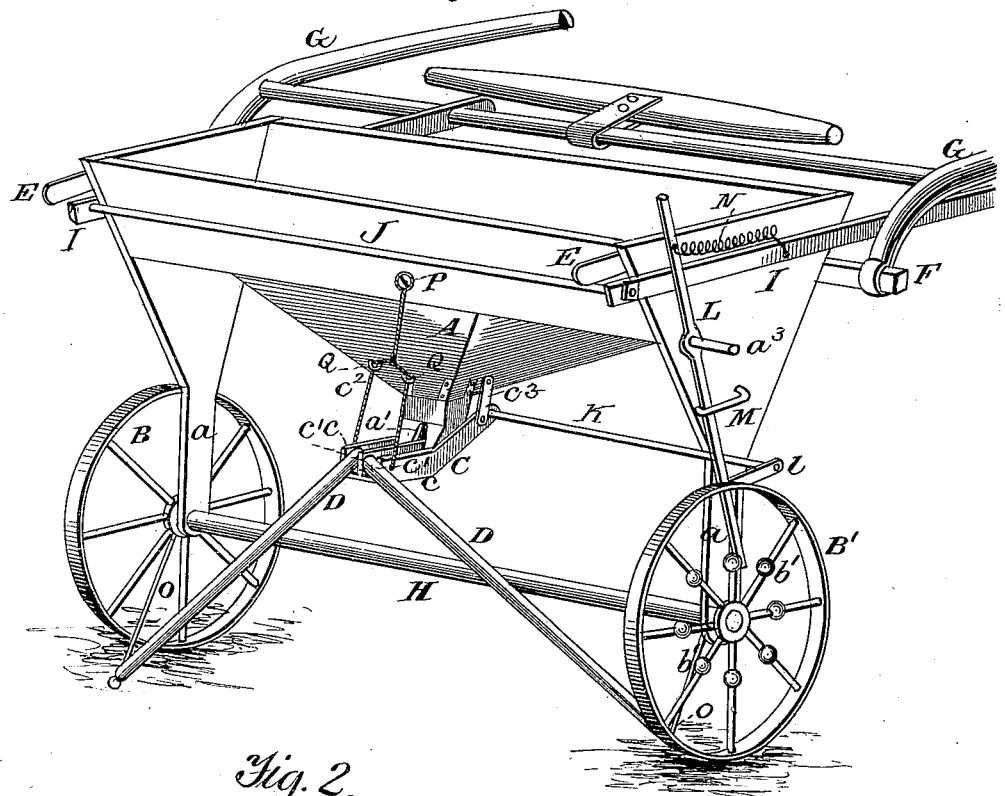
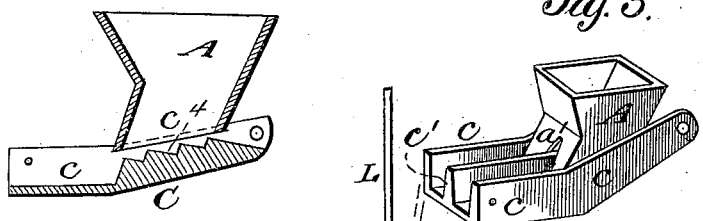
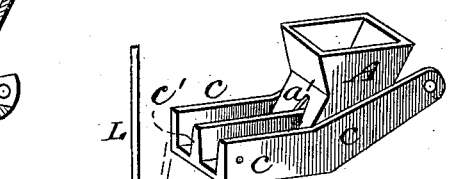
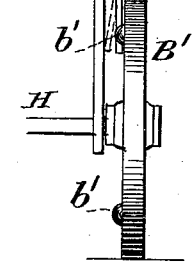
Witnesses.
A. Ruppert
R. E. Grant
Inventor.
John I. Du Bois
Per
Thomas P. Simpson
Atty.

UNITED STATES PATENT OFFICE.

JOHN I. DU BOIS, OF MARLBOROUGH, NEW JERSEY.

APPARATUS FOR DROPPING FERTILIZER IN ROWS.

SPECIFICATION forming part of Letters Patent No. 356,224, dated January 18, 1887.

Application filed June 2, 1886. Serial No. 203,897. (No model.)

*To all whom it may concern:*

Be it known that I, JOHN I. DUBOIS, a citizen of the United States, residing at Marlborough, in the county of Monmouth and State of New Jersey, have invented certain new and useful Improvements in Apparatus for Dropping Fertilizers in Rows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claims.

Figure 1 of the drawings is an elevation in perspective. Fig. 2 is a vertical section of the hopper with its bottom connection. Fig. 3 is a detail view in perspective of the same parts; and Fig. 4 is a rear elevation of the wheel, lever, and adjuncts.

In the drawings, A represents the hopper made smaller at the bottom than at the top and placed upon two wheels, B B'. At the bottom of the hopper A is arranged the movable plate C, which divides the powdered or finely-divided fertilizer and guides it into two pipes, D D, through which it passes down into two parallel rows and is scattered by the wheels.

E E are handles extending rearwardly from the hopper A; F, a shaft-bar, to which may be attached thills G, and H the axle on which wheels B B' turn and the downwardly-projecting hopper-arms $a\ a$ are secured.

I I are two bars, made fast to the sides of hopper, connected at the rear end by the rod J, and projecting in front to support the thills.

The hopper A has a front slot, $a'$, through which passes the middle flange, $c'$, of the plate C, while the flanges $c\ c$ are on the outside thereof. The hopper has no bottom, the fertilizer resting on the plate C, which is hung by a pivoted strap, $c^2$, to the hopper, and at the rear end is suspended by a flexible hanger, $c^3$. This allows the plate to be swung and shaken by the rod K, which extends across from the rear of plate C to the arm $l$ on the lever L. The latter is fulcrumed on the stud $a^3$, extending out from one side of the hopper A, has its motion limited by a guide-keeper, M, on hopper, and is retracted by a spring, N, attached to one of the bars I.

At a suitable point on each spoke of the wheel B', I make a ball, projection, or stud, $b'$, which at each revolution of the wheel strikes the lower end of lever L. This shakes the dropper-plate C and causes it to discharge a certain portion of the fertilizer. Practically, the studs $b'$ on the spokes act so quickly in succession that the dropping is continuous. If it is desired that the dropping shall cease, it is only necessary to move the lever out on the stud $a^3$, where the spring will retain it so that the studs $b'$ cannot strike its lower end.

On the bottom of shaker-plate C are formed the transverse steps $c^4$ and a dividing-rib, $c'$, extending to the bottom step. After the fertilizer passes down the tubes, it falls on a little knob on the lower end of the rod O, to which a chain may be attached.

The shaker-plate can be raised and lowered by turning the screw P, which causes the two branches of the flexible hanger to move through the loops formed by the staples Q Q, so as to regulate the quantity of the fertilizer to be distributed.

The machine is operated by a single horse, who walks between the rows, while the wheels run in the rows. Of course it can be used with any seed which is planted or sowed in rows.

Having described my invention, what I claim as new, and desire to protect by Letters Patent, is—

1. In a fertilizer-distributer, the combination, with a bottomless hopper, of the shaker C, supporting and dividing the fertilizer, and the two diverging pipes D D, whereby the comminuted manure may be evenly distributed in two adjacent rows at one operation, as described.

2. The combination, with an axle, two wheels, and a hopper carrying rear handles, E E, of a shaft-bar, H, the two bars I I, projecting in front, and the rod J, whereby thills may be attached and upheld, as shown and described.

3. A bottomless hopper, having the slot $a'$, in combination with a plate, C, pivoted to swing thereunder, having the upwardly-extending flanges $c$ $c'$ $c$, and provided on its upper side with the transverse steps $c^4$, as shown and described.

4. The combination, with a lever, L, operated by a ground-wheel and a shaking-plate, C, under the hopper, of a lever-arm, $l$, a hopper-stud, $a^3$, and a rod, K, all arranged as shown and described.

In testimony whereof I affix my signature in presence of two witnesses.

JOHN I. DU BOIS.

Witnesses:
HENRY W. PARKER,
JNO. T. ROSELL.